No. 123,005

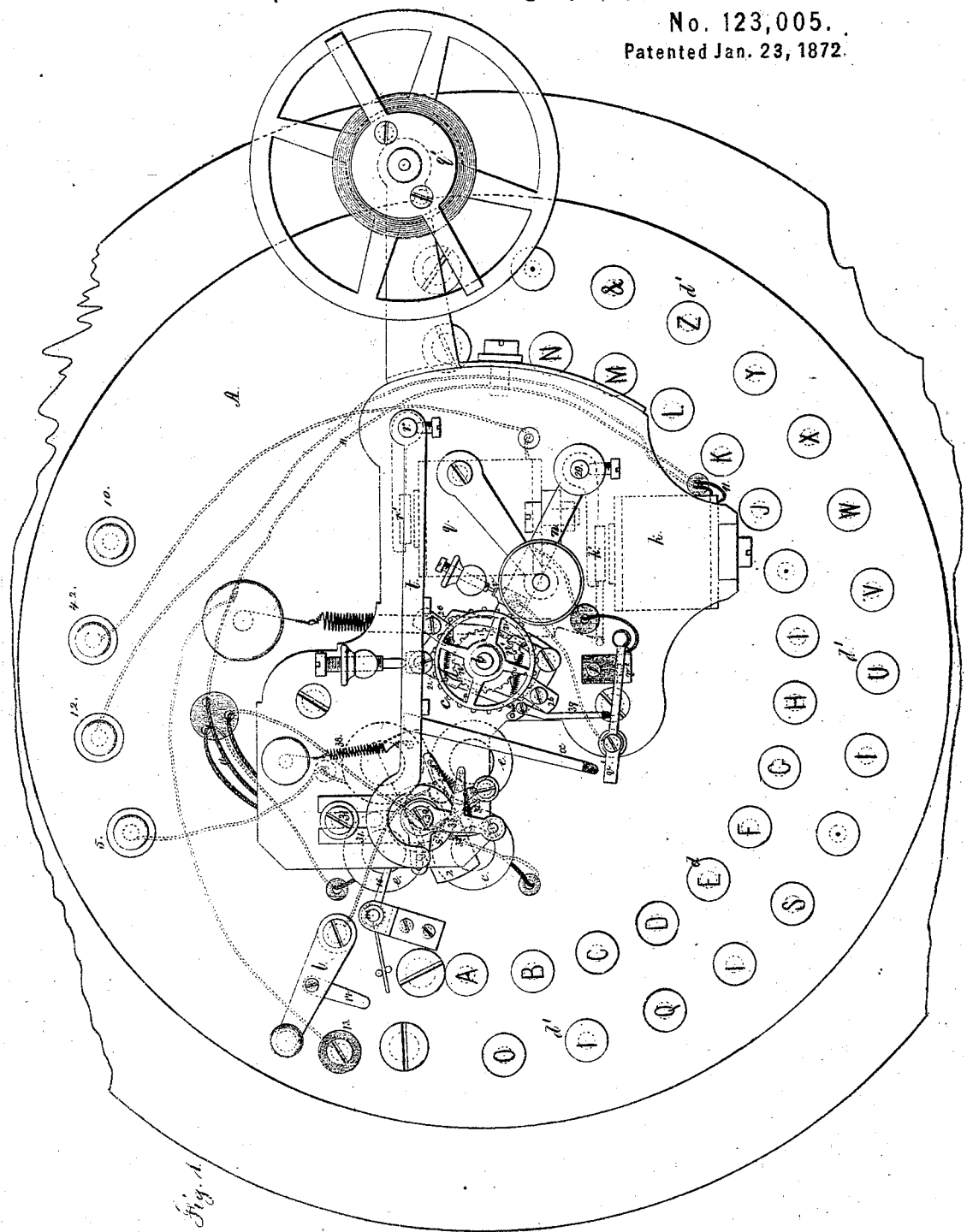

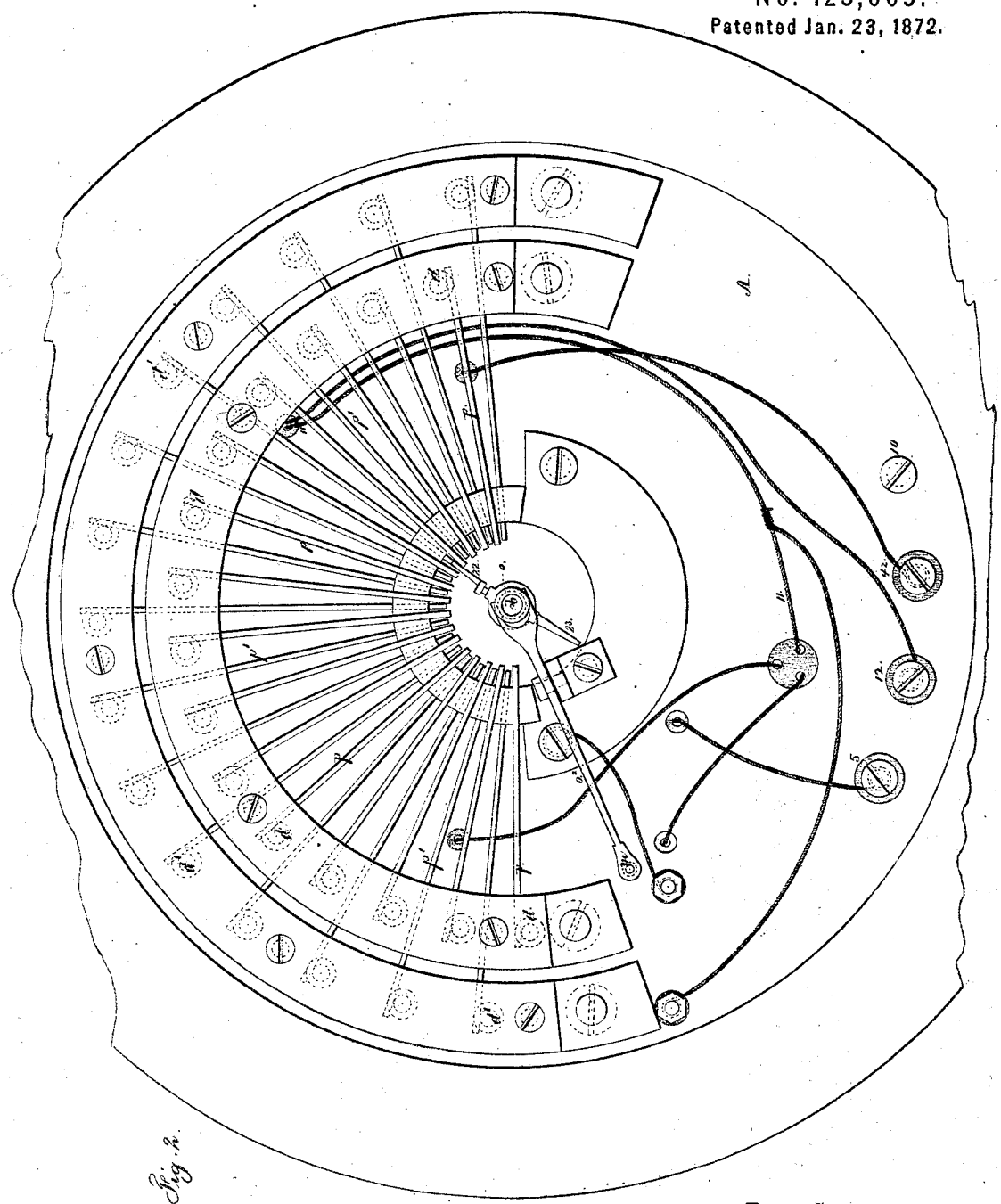

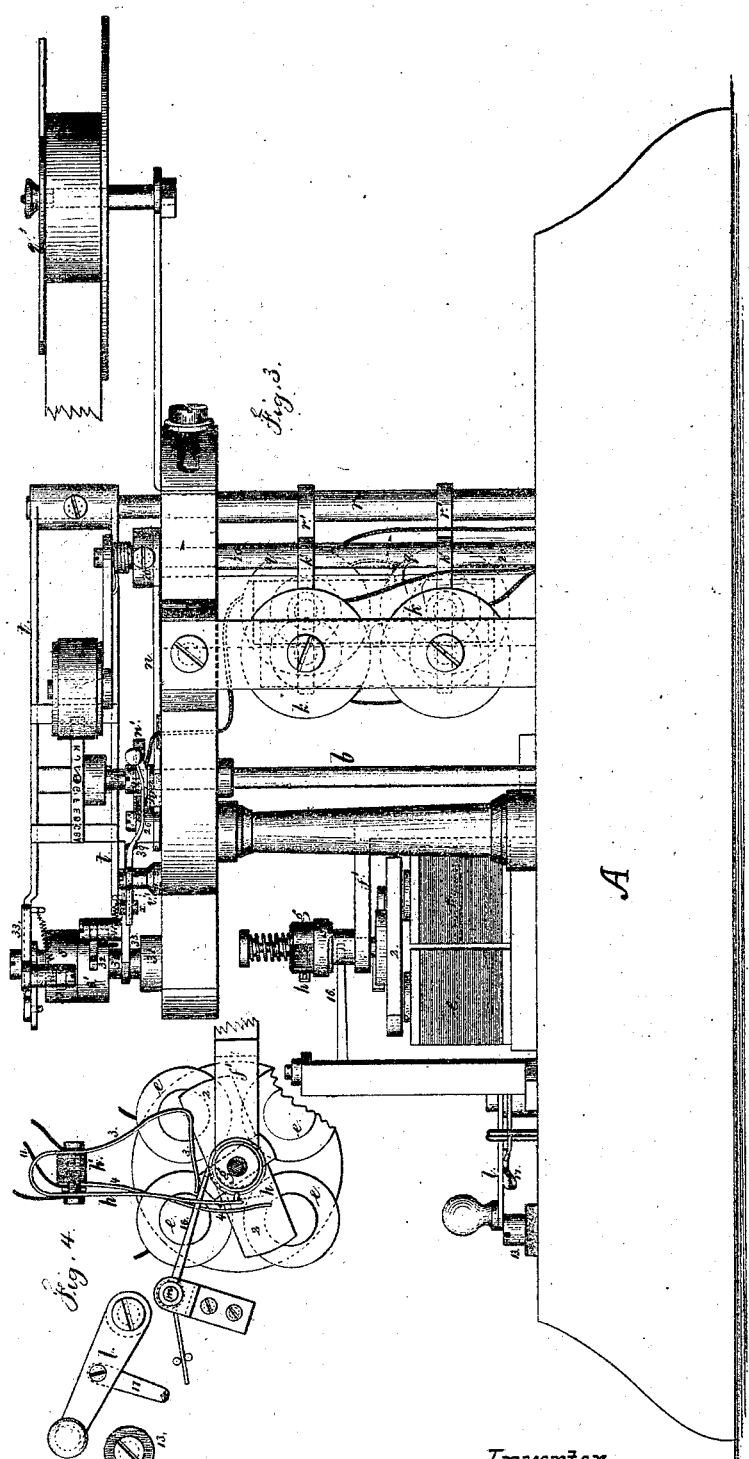

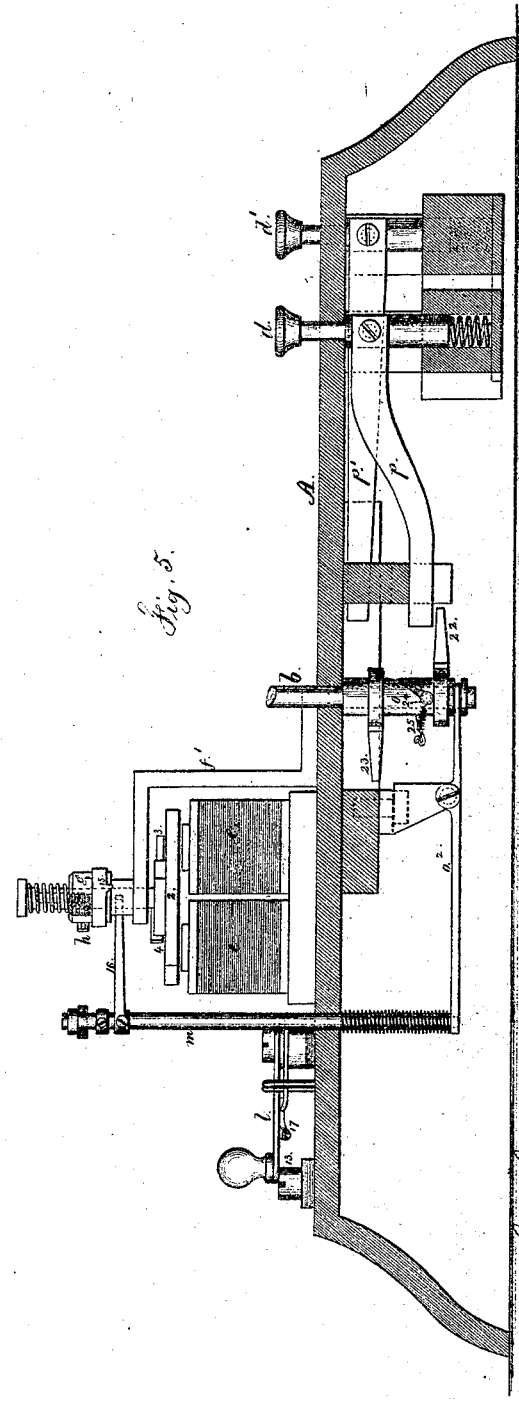

UNITED STATES PATENT OFFICE.

THOMAS A. EDISON, OF NEWARK, NEW JERSEY, ASSIGNOR TO "THE GOLD AND STOCK TELEGRAPH COMPANY," OF NEW YORK CITY.

IMPROVEMENT IN TELEGRAPH APPARATUS.

Specification forming part of Letters Patent No. 123,005, dated January 23, 1872.

*To all whom it may concern:*

Be it known that I, THOMAS A. EDISON, of Newark, in the county of Essex and State of New Jersey, have invented and made an Improvement in Printing-Telegraphs; and the following is declared to be a correct description thereof.

This instrument I term the "Universal Printing-Telegraph;" and it is intended as a transmitting and as a receiving instrument. When used as a transmitting instrument a small magnetic motor, driven by a local battery, makes and breaks the main circuit, and the pulsations operate through a magnet in the transmitting-machine, and also in the receiving-machine or machines, to rotate the type-wheel by a step-by-step movement, and the type-wheels, hence, move in harmony. When a finger-key at the transmitting-station is depressed the type-wheel of that machine is stopped, when an arm upon its shaft comes in contact with the said key. This causes the simultaneous stoppage of pulsations over the main line, arresting all the type-wheels at the same point. The impression is now made simply in consequence of the pause that ensues, for the arm that operates the type-wheel pawls closes the circuit of the transmitting instrument through its own printing-magnet and the other printing-magnets of the line, and the impression is taken. The movement of the impression-lever breaks its own circuit, so that the pad is drawn instantly back by the spring of the impression-lever, and the circuit to the printing-magnet remains broken until the type-wheel is set in motion again, which throws a switch that again closes the circuit to the printing-magnet. The rapidity of movement, however, of the type-wheel lever is such that the printing-magnet does not have time to become sufficiently charged to move the printing-lever before the circuit to said magnet is again broken; hence the printing-magnet is not brought into action except when the pause takes place upon stopping the type-wheel. The circuit through the printing-magnet may either be the main circuit or a local.

In the drawing, Figure 1 is a plan of the instrument. Fig. 2 is an inverted plan. Fig. 3 is a partial side view. Fig. 4 is a plan of the motor and connections, and Fig. 5 is a section, showing the loose sleeve and incline that operate the stop for revolving pulsator.

The bed A is provided with a shaft, $b$, upon which is the type-wheel $c$. This shaft $b$ is the center of the semicircular ranges of keys $d$ $d'$, the number of which corresponds to the divisions upon the type-wheel; and they should be marked with similar characters arranged properly for the type-wheel. Upon the bed A is a magnetic motor, made of a pair of magnets, $e$ $e$, armature 2, and spring circuit-closers 3 4, connected with the binding-screws 5 and 10 and a local battery, by means of which the armature 2 will be rotated with rapidity. The armature 2 is on a vertical shaft in the frame $f'$, and upon this shaft is the pulsator $g$ and a friction-spring that causes the necessary power to be applied to rotate the pulsator, but allows the motor to continue when the pulsator is arrested. This pulsator $g$ is made cylindrical, but of alternate conducting and non-conducting materials, and a spring, $h$, rests against the side thereof, and is supported by a column of non-conducting material, $h'$. The metallic connection from the main-line battery is through the binding-screw 10 to the bed of the machine, through the shaft and conducting-surface of the pulsator $g$, spring $h$, and wire 11, to the magnet $k$ that moves the type-wheel; thence to the binding-screw 12, main line, and distant instrument. At the distant instrument the switch $l$ is moved to the insulated anvil 13, and connects the bed and screw 10 of the machine with one of the wires of the magnet $k$, the other wire of the magnet going to the binding-screw 12, and the pulsator of the receiving-machine is instantaneously stopped, so that all the instruments in the line may be moved by the pulsator at the sending-station only. Upon the pulsator $g$ there are catches, 15, and an arm, 16, upon a vertical sliding shaft, $m$, is raised by the finger 17 of the switch $l$ so as to be in the path of one of the catches 15, to arrest the further revolution of the pulsator of the receiving-machine at a point when the arm 16 is upon the non-conducting surface. Thereby the circuit through the pulsator is broken, but connected through the switch $l$, as aforesaid. The motors at the receiving-station may continue to revolve, but are not operative. All the magnets $k$ in the line are operated in unison by pulsations from the pulsator of the transmitting-machine, and in each machine the armature $k'$ swings on the shaft 20 and operates the lever $n$, that carries the pawls 21 and stops 26, to the ratchet-wheel $n'$, upon the shaft $b$ of the type-wheel $c$; hence all the type-wheels will move around in unison with a step-by-step motion; and when the pulsator at the sending-station is stopped all the type-wheels in the circuit stop, and they stand at the same points.

I next proceed to describe how the pulsator is stopped at the sending-station when its type-wheel and all others in the circuit are in position to have letter impressed corresponding to the finger-key $d$ or $d'$ that is acted upon. The type-wheel shaft carries a sleeve, $o$, with fingers 22 and 23 on opposite sides, and one below the other. The keys $d$ $d'$ being in semicircular ranges, each key has an arm below the bed A, extending radially toward the shaft $b$. The arms $p$ are upon the keys $d$, and act with the fingers 22, and the arms $p'$ are upon the keys $d'$ and act with the fingers 23.

In the normal position the fingers 22 and 23 revolve clear of the arms $p$ $p'$, but when a key is depressed the arm of that key stops the finger 22 or 23 and sleeve $o$. In this sleeve $o$ is an inclined slot with a pin, 24, from the shaft $b$ therein, and a slight spring, 25, yields as the sleeve is stopped, and the shaft $b$ continues to move sufficiently to give the sleeve $o$ a downward movement by the pin 24 in the inclined slot, and by the lever $o^2$ lift the vertical sliding rod $m$ and arm 16, stopping the pulsator and all the type-wheels with the types corresponding with the depressed key in position ready for printing.

I next describe the means for giving the impression. The printing-lever $t$ is upon the shaft $r$, that is operated upon by the armature $r'$ of the electro-magnet $q$. The paper passes from the reel $q'$ in front of the impression-pad, and then between the roller-segments $s$ $s'$ and clamps 32. These roller-segments are upon a stationary stud, 30, that is adjustable by the slotted frame and screw 31, and upon the respective roller-segments $s$ $s'$ are arms 33, carrying the feeding-clamps 32, and slotted ends to the arms 33 are acted upon by pins in the printing-lever $t$. The parts are in reverse position, so that one clamp acts to pull the paper along as the printing-lever moves one way, and the other clamp acts as the lever moves the other way, thereby moving the paper along each impression. By this arrangement the printing-lever acts to better advantage to swing the feeding-clamps than in the devices heretofore employed. A spring, 38, draws back the printing-lever. A circuit-closer, $v$, comes in contact with the type-wheel lever $n$ every pulsation, but the contact is so instantaneous that the electro-magnet $q$ has not time to act against its tension-spring to give the pulsation; but the moment the pulsator stops, and the type-wheel also stops by the circuit of the pulsator being broken, the contact of $v$ and $n$ closes the circuit from the screw 10, and bed of the machine through the lever $n$, closer $v$, lever $v^1$, insulated plate $v^2$, and wire to the magnet $q$, thence to the binding-screw 42, and this circuit may be part of the main line, or a local circuit at each station. The closing of this circuit gives the impression and feeds the paper, and also breaks its own circuit, for as the printing-lever comes up to give the impression the insulated arm $x$ projecting from the printing-lever $t$ moves the lever $v^1$ off the plate $v^2$, and breaks the circuit through the printing-magnet so that the printing-lever is instantly drawn back by its spring.

As soon as the operator at the transmitting-station raises his finger from the depressed letter-key that key is raised by its spring, the sleeve $o$ is turned back by its spring 25, the sliding rod $m$ and arm 16 drop, and the pulsator is again revolved by its motor, and all the type-wheels start off upon their rapid step-by-step rotation in harmony, until another key is depressed and the operation is repeated. The arm 39 from the lever $n$ replaces the switch-lever $v^1$ in contact with the plate $v^2$, the first movement of the lever of the type-wheel hence the circuit connection is restored ready for the next printing operation.

I claim as my invention—

1. A pulsator driven by friction, and acting to make and break an electrical circuit in which are the magnets, operating two or more type-wheels in unison, substantially as set forth.

2. The pulsator constructed substantially as set forth, in combination with a magnetic motor and the type-wheel and its magnet, substantially as set forth.

3. The pulsator $g$ and its arm 16, in combination with the switch $l$ and the metallic connections, substantially as set forth, for stopping the pulsator at the receiving-station and completing the electric connections to the type-wheel magnets.

4. The type-wheel shaft $b$ and type-wheel $c$, in combination with the sleeve $o$ and its incline for giving an end movement to the sleeve when its rotation is arrested, substantially as set forth.

5. The arms 22 and 23 and sleeve $o$, in combination with the keys $d$ $d'$ and the pulsator stop 16, and pulsator $g$, substantially as and for the purposes set forth.

6. The feeding-roller segments $s$ $s'$ and pawls 32, arranged substantially as shown, and operated by the printing-lever $t$ acting upon the arms 33, substantially as shown.

7. The printing-lever magnet in an electric circuit that is closed by the movement of the lever that operates the type-wheel, substantially as set forth, so that the printing-magnet is brought into action by a pause in the rotation of the type-wheel.

8. The lever or switch $v^1$, in combination with the impression-magnet and printing-lever, substantially as set forth, for breaking the circuit automatically to the printing-magnet.

9. The printing-lever $t$ and magnet in combination with the type-wheel lever $n$, arms $x$ and 39, and switch-lever $v^1$, substantially as and for the purposes set forth.

10. A type-wheel moved with a step-by-step movement, an electro-magnet for the same, and a pulsator, in combination with a secondary circuit to the printing-magnet operated automatically, substantially as set forth.

11. A series of printing-telegraph instruments arranged in one main electrical circuit and operated by the pulsator of any one machine in that circuit acting as a transmitter, and all the machines acting in harmony as receiving-machines, the pulsation in each receiving-machine being stopped or thrown out of action, substantially as set forth.

12. A printing-telegraph instrument containing a pulsator, type-wheel, type-wheel magnet, a switch, and letter-keys, substantially as specified, so as to act as a receiving or transmitting machine by the movement of the switch, as specified.

Signed by me this 26th day of July, A. D. 1871.

T. A. EDISON.

Witnesses:
GEO. T. PINCKNEY,
CHAS. H. SMITH.